May 28, 1968 SOICHIRO HONDA ET AL 3,385,053
APPARATUS AND METHODS FOR PURIFYING THE EXHAUST GASES
OF AN INTERNAL COMBUSTION ENGINE
Filed Sept. 6, 1966
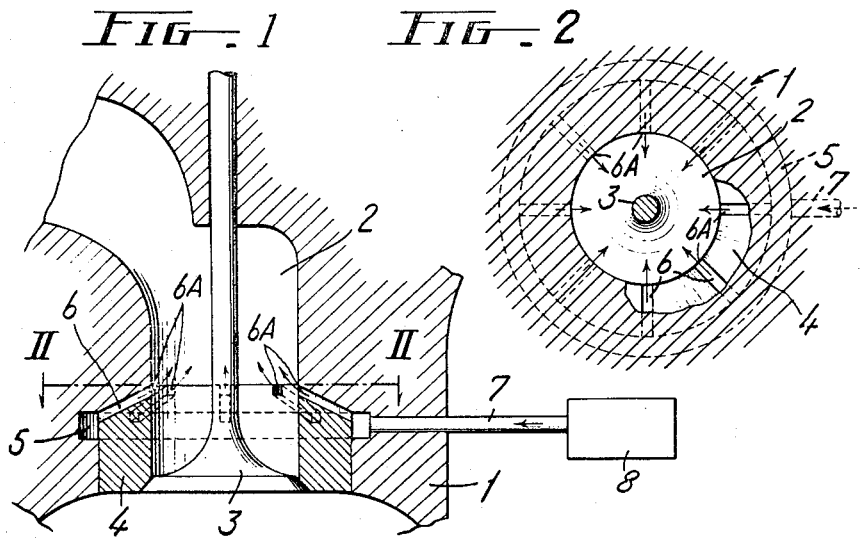
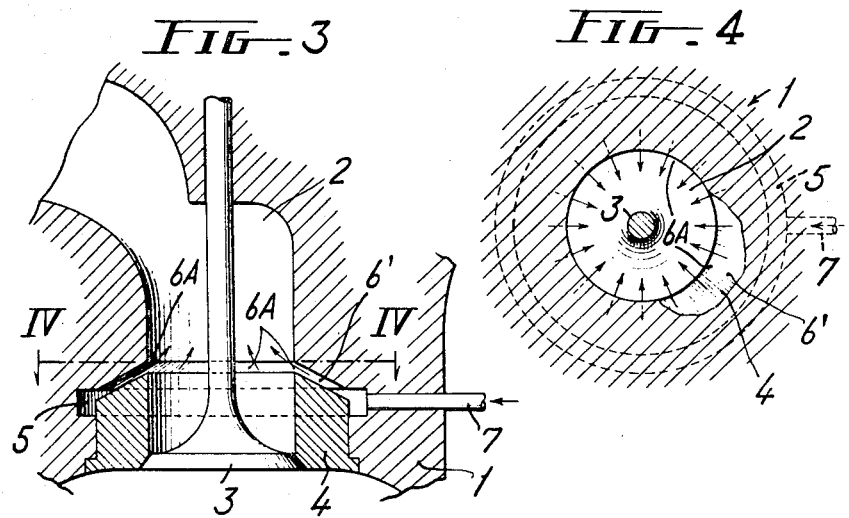
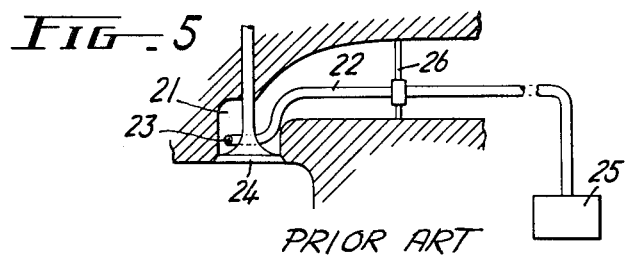
PRIOR ART
Soichiro Honda et al

United States Patent Office

3,385,053
Patented May 28, 1968

3,385,053
APPARATUS AND METHODS FOR PURIFYING THE EXHAUST GASES OF AN INTERNAL COMBUSTION ENGINE
Soichiro Honda, Shinjuku-ku, Tokyo, and Shizuo Yagi and Akira Ishizuya, Kitaadachi-gun, Japan, assignors to Kabushiki Kaisha Honda Gijutsu Kenkyusho, Yamato-machi, Kitaadachi-gun, Saitama-ken, Japan
Filed Sept. 6, 1966, Ser. No. 577,510
Claims priority, application Japan, Sept. 15, 1965, 40/56,096
7 Claims. (Cl. 60—30)

ABSTRACT OF THE DISCLOSURE

An air passage is formed between a valve seat member and the body of an exhaust valve of an internal combustion engine, and air is supplied through the air passage and flows along a straight path which is inclined in the direction of exhaust gas flow in the exhaust gas passage. The air is directly introduced into the exhaust gas passage and purifies the exhaust gases while also cooling the valve seat member.

---

The present invention relates to methods and apparatus for purifying the exhaust gases of an internal combustion engine.

It is contemplated according to the invention to reburn the exhaust gases to minimize contamination of the air.

It is known to reburn the exhaust gases to minimize air contamination by apparatus which has the deficiency that the output power of the engine, especially at high speed revolutions, is lowered by the intrusion of air supply means in the exhaust gas passage. Additionally, the control of the air supply is hindered as a result of the back pressure to the air supply which varies widely with the change in engine speed.

An object of the present invention is to avoid the above deficiencies and to provide apparatus for purifying the exhaust gases in which the output power of the engine will be substantially unaffected and the air supply will be uniform and substantially unaffected with change in engine speed.

It is another object of the invention to cool the exhaust valve seat by the air which is supplied for reburning the exhaust gases.

According to the invention, an air supply passage is formed in the region of the valve seat of an exhaust valve of the engine, said air supply passage having an outlet opening into the exhaust passage for the exhaust gases, which is flush with the surrounding wall surface, said air supply passage being inclined toward the direction of outflow of the exhaust gases. The air supply passage has an inlet for receiving ambient air and the same may be delivered to the exhaust passage by the effect of the suction produced by the flow of exhaust gases. Additionally, a pump or the like may be connected to the air inlet to supply the air under pressure.

During the passage of the air it cools the valve seat.

The air supply passage is constituted by one or a plurality of channels arranged around the exhaust passage and an annular duct which is in communication with each said channel.

Several embodiments of the invention will next be described in detail, with reference to the attached drawing, wherein:

FIGURE 1 is a side view in section of one embodiment according to the present invention, FIGURE 2 is a sectional view taken along line II—II in FIG. 1, FIGURE 3 is a sectional side view of a modified embodiment of the apparatus of the present invention, FIGURE 4 is a sectional view taken along line IV—IV in FIG. 3, and FIGURE 5 is a diagrammatic illustration of one example of the apparatus of this kind known in the prior art.

Before describing the invention in detail, it is helpful to describe a known device for supplying air to the exhaust gas of an internal combustion engine to reburn such exhaust gas. This device is shown in FIG. 5 wherein an air supply pipe 22 is supported in an exhaust passage 21 of the engine in a manner such that an outlet 23 of pipe 22 is disposed immediately behind exhaust valve 24. An air pump 25 supplies fresh air to pipe 22 to cause the air to be discharged from opening 23 and be mixed with the exhaust gas, whereby harmful unburned ingredients remaining in the exhaust gas will be thereby burned. The apparatus in FIG. 5 has several deficiencies, particularly the lowering of the output power of the engine, especially at high speeds by virtue of the increased resistance to the exhaust gas flow by the air supply pipe 22 and its support member 26. Additionally, the control of the quantity of air is hindered because the back pressure acting on the air pump 25 through the outlet 23 varies widely with change in engine speed.

The present invention avoids the above deficiencies in a manner which will become evident from the following consideration of the present invention.

In the drawing there is shown a body 1 of the internal combustion engine defining an exhaust passage 2 for the flow of exhaust gases to discharge. An exhaust valve 3 is mounted in the body and controls the flow of exhaust gases in known manner. A valve seat member 4 is mounted in the body 1 for the seating of the valve 3. Air supply channels 6 are formed between the end surface of valve seat 4 and wall body 1, which have openings 6a which are flush with the inner wall surface bounding the exhaust passage 2. These channels are arranged around exhaust passage 2 in circumferentially spaced relation. While it is preferred to employ a plurality of channels 6, as shown in FIGS. 1 and 2, the channel may also be constituted by a single channel 6', as shown in FIGS. 3 and 4, which is of continuous annular shape. Channels 6 and channel 6' are inclined slightly towards the direction of outflow of the exhaust gases, the significance of which will become apparent later on. An annular duct 5 surrounds the valve seat 4 and is in communication with the channels 6, 6'. An air supply conduit 7 is mounted in the body 1 and is in communication with duct 5 for supplying air thereto. The conduit 7 is in communication with ambient air, preferably through pump 8 which can supply the air to conduit 7 under pressure. The pump 8 is driven by the crank shaft of the engine whereby the air is delivered continuously to passage 2.

The inclination of channels 6 and 6' facilitates the flow of ambient air into passage 2 due to the suction effect produced by the flow of the exhaust gases. Hence, it may be possible to avoid the need for pump 8.

As the air flows from outside the engine to the exhaust passage 2, it serves to cool the valve seat 4, thereby prolonging its life.

Although the channels 6 and 6' have been shown as formed between the valve seat 4 and the body 1, it is also possible to form the channels within the valve seat 4 itself or within body 1 itself. Moreover, a further annular body may be mounted in the body 1 to form a part thereof and the channels may be provided therein and the valve seat mounted in such annular body.

In the apparatus of the present invention no structural element projects within the exhaust passage 2 whereby no increase in the resistance of the flow of the exhaust gases will be produced. Furthermore, the inclination of the direction of flow of the air discharged from the openings 6a towards the direction of outflow of the exhaust gas results in the formation of relatively little resistance against the exhaust gas flow. For these reasons the back pressure of the engine is not increased and the output thereof is not decreased. The inclination of the projecting air flow is also effective in decreasing the projecting resistance of the same so that the back pressure of the pump may be lowered and the control of the quantity of air facilitated.

There has therefore been shown hereinabove apparatus for purifying the exhaust gas of an internal combustion engine by reburning the exhaust gas behind the exhaust valve of the engine by supplying ambient air through an air passage constituted by conduit 7, duct 5 and channels 6 or 6', wherein the latter are inclined towards the direction of outflow of the exhaust gas and have openings 6a which are flush with the inner wall surface bounding the exhaust passage. Moreover, the air supply passage is in the vicinity of the valve seat 4 to cool the same during its flow to the exhaust passage 2.

Numerous modifications and variations of the disclosed invention will now become apparent to those skilled in the art wthout departing from the scope and spirit of the invention if defined in the attached claims.

What is claimed is:

1. Apparatus for purifying the exhaust gas of an internal combustion engine having a body defining an exhaust passage for the gas and a valve member controlling the flow of exhaust gas into said passage, said apparatus comprising a valve seat member in said body surrounding the exhaust valve for the seating thereof, said valve seat member and body defining an air supply passage having an outlet which opens into said exhaust passage and an inlet for receiving ambient air, said valve seat member and body having elongated parallel walls bounding said air supply passage, said walls being inclined towards the direction of outflow of the exhaust gas, said body having an inner wall surface bounding said exhaust passage, said outlet of the air supply passage being flush with the wall surface.

2. Apparatus as claimed in claim 1, wherein said air supply passage is constituted by a plurality of rectilinear channels arranged around said exhaust passage in circumferentially spaced relation.

3. Apparatus as claimed in claim 2 comprising an annular air supply duct in communication with said channels.

4. Apparatus as claimed in claim 1 comprising means for supplying air under pressure to said air supply passage.

5. Apparatus as claimed in claim 1, wherein said air supply passage is constituted as an annular frusto-conical channel encircling the exhaust passage.

6. A method of reburning exhaust gases with the apparatus as claimed in claim 1 comprising discharging exhaust gases through the exhaust passage, and supplying air to the exhaust passage continuously to reburn the exhaust gases at the rear of the exhaust valve and to cool the valve seat member, the air being supplied through said air supply passage and thereby having little effect on the flow resistance of the exhaust gases.

7. A method as claimed in claim 6, wherein the air is caused to flow into the exhaust passage in a straight path in a direction having a component facing in the direction of passage of the exhaust gases through the exhaust passage to decrease the flow resistance of the air.

References Cited

UNITED STATES PATENTS

| 1,873,119 | 8/1932 | Griswold. | |
|---|---|---|---|
| 2,295,436 | 9/1942 | Tendler | 60—30 |

FOREIGN PATENTS

| 39,448 | 11/1928 | Denmark. |
|---|---|---|

OTHER REFERENCES

Alien property custodian publication, 4/43, Schmidt, 60/30.

RALPH D. BLAKESLEE, *Primary Examiner.*